United States Patent [19]

Sartori

[11] 4,373,828

[45] Feb. 15, 1983

[54] DEVICE FOR RIGIDLY COUPLING A HANDLE TO ITS CORRESPONDING MANUAL INSTRUMENT, AND AN INSTRUMENT PROVIDED WITH THE SAID DEVICE

[76] Inventor: Francesco Sartori, Via S. Felice, 44, Bologna, Italy

[21] Appl. No.: 217,459

[22] Filed: Dec. 17, 1980

[30] Foreign Application Priority Data

Dec. 21, 1979 [IT] Italy .................. 3572 A/79

[51] Int. Cl.³ .................. B25G 3/00; F16B 9/00; F16L 41/00
[52] U.S. Cl. .................. 403/263; 403/348; 403/353
[58] Field of Search .............. 403/263, 348, 349, 350, 403/353, 351

[56] References Cited

U.S. PATENT DOCUMENTS

| | | | |
|---|---|---|---|
| 2,189,056 | 2/1940 | Carrington | 403/348 |
| 2,546,157 | 3/1951 | Hume | 403/351 |
| 2,862,738 | 12/1958 | Bayley | 403/349 |
| 3,514,570 | 5/1970 | Bernard et al. | 403/350 X |
| 3,600,735 | 8/1971 | Jerabek | 403/348 X |

FOREIGN PATENT DOCUMENTS 2633147 1/1978 Fed. Rep. of Germany ...... 403/264

Primary Examiner—Wayne L. Shedd

[57] ABSTRACT

Disclosed herein is a device for rigidly coupling a handle to its corresponding manual instrument, and an instrument provided with the said device, comprising: a first element that can be connected to a handle, or else be made in one piece therewith, and has a terminal stem, the diameter of which is less, provided with projections whose surfaces, turned towards a shoulder defined by it with respect to the body of the first element, slope both with respect to the axis of the first element and to a plane perpendicular to the said axis; a second element provided internally with an axial hole, which allows the passage of the first element, and a number of projections equal in number or a multiple of those of the said stem, with lower surfaces shaped to accept flush therewith the sloping surfaces of the projections with which the said stem is provided.

The coupling is ensured by a ring nut that can be screwed to the first element and be carried flush up against the upper surface of the body of the instrument to which the second element is fastened, and by a locator member positioned at the side of at least one of the projections on the second element.

8 Claims, 8 Drawing Figures

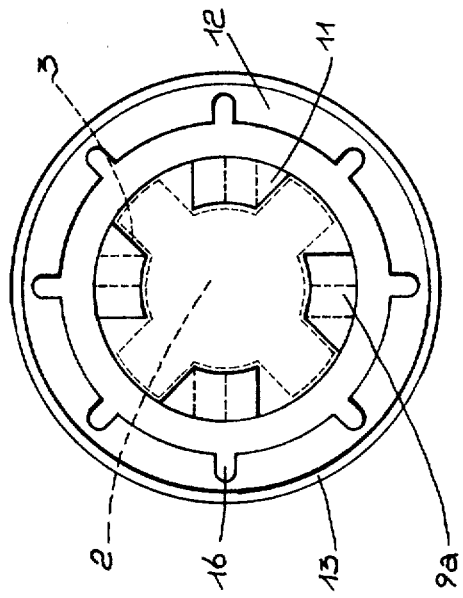
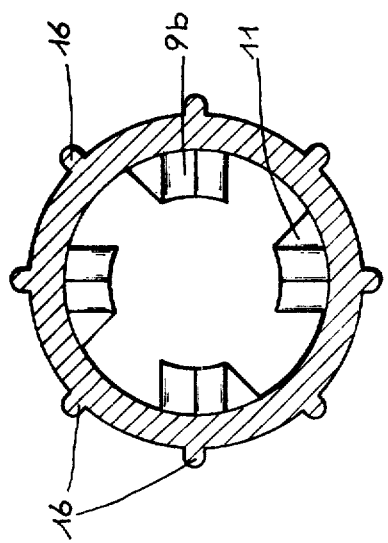
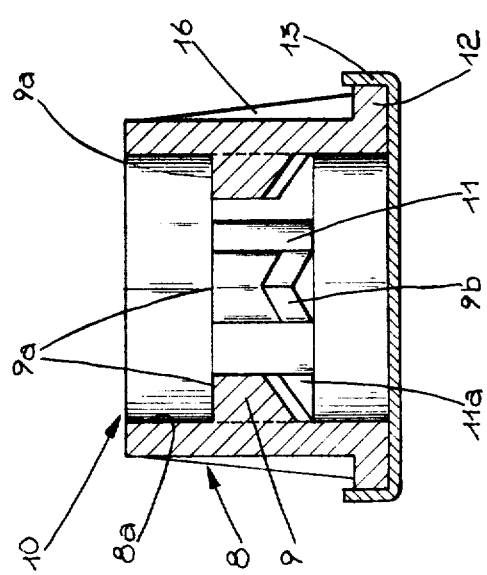

DEVICE FOR RIGIDLY COUPLING A HANDLE TO ITS CORRESPONDING MANUAL INSTRUMENT, AND AN INSTRUMENT PROVIDED WITH THE SAID DEVICE

BACKGROUND OF THE INVENTION

The device has as its subject a device for rigidly coupling a handle to its corresponding manual instrument, and an instrument provided with the said invention.

The instrument in question can be, for example, a broom, a scrubbing brush, a paint-brush, a rake or some other instrument that needs a handle in order to be used by the operator.

DESCRIPTION OF THE PRIOR ART

Various solutions are already known that aim at achieving stable coupling between a handle and, for example, the bristle support block of a broom or scrubbing brush.

The most usual of these solutions envisages the coupling taking place by wedging or screwing the handle into the bristle support block and it presents the problem of the stable coupling not being guaranteed at the time the instrument is in use. Frequently, in fact, the necessary has to be done to tighten the screw connection between the handle and the said block, or to force the handle therein more satisfactorily.

As time goes by, irremediable play forms whereby the rigid connection of the parts is no longer possible.

Then again, for brooms, scrubbing brushes and similar, certain somewhat sophisticated solutions are known wherein use is made of a fork with two prongs, the fork being connected to the handle and the prongs inserted in the bristle support block and locked thereto by means of cam devices that cause the divarication of the prongs and force the extremities thereof into corresponding housings made in the lower surface of the said block.

In this case, it is necessary for the blocks, generally constituted by solid battens to which are fixed, in accordance with known techniques, various tufts of bristles, to have in the lower part thereof suitable spaces through which the prongs are able to pass, which define "islands" or rather, apertures, in which it is obviously not possible to fix anything. In the specific case in question, the instrument, be it a broom, a scrubbing brush or something else, thus has a bristle support block with completely empty areas, which is prejudicial both to the satisfactory use of the instrument and to the cleaning action thereof.

Solutions of this nature have, furthermore, a high realization cost and do not guarantee the complete and rigid locking of the instrument to the handle; also, the insertion of the extremities of the prongs into the housings provided in the aforementioned block is generally done without forcing, and this offers the possibility of play forming between the handle and the bristle support block.

These solutions also necessitate the use of special machines for fitting the tufts of bristles to the block, programmed in such a way as to avoid the apertures present in the block in the region of the surface to which the tufts are fitted, this all being to the disadvantage of production costs.

Other solutions envisage the handle being provided with a "T" head that passes across a through hole in the block and, following an angular rotation with respect to the block, can be coupled with corresponding housings or recesses made in the lower surface of the said block.

A ring nut that is screwed to the handle and is then carried flush up against the upper surface of the block, then locks the said head closely to the base surface of the recess.

These solutions, just as with those mentioned earlier on, present the problem of requiring at least one aperture in the lower surface of the block in order to allow the movement of the "T" head where, as has been seen, it is not possible for bristles to be fitted.

SUMMARY OF THE INVENTION

The object of the invention is to overcome the aforementioned difficulties and, more precisely, to make available a device for rigidly coupling a handle to its corresponding manual instrument, by means of which it is possible to achieve efficient locking of the support block of the instrument to the handle without the possibility of one rotating with respect to the other or of any play forming between the parts that cannot easily be taken up.

A further object of the invention is to make available a device of the type stated, that can be inserted in or be coupled to the block, or to the body, of the instrument prior to or at the time the latter is being made, and is provided with means for rapidly tracing and stably maintaining the mutual coupling position of the component parts thereof, and thus of the handle to the corresponding instrument.

Yet another object still is to make available an instrument, provided with the device of the stated type, that does not have any spaces or voids in the region of the surface opposite that turned towards the handle, the said surface being filled completely with tufts of bristles in cases when the instrument is, for example, a broom, scrubbing brush or similar.

In the case of instruments of a different type, the device is hidden completely from view and is protected against any body or external cause.

The objects outlined above are all attained with the device forming the subject of the invention, of the type constituted by two elements that can be coupled together by rotating one with respect to the other, essential features of which are that it comprises: a first virtually cylindrical element having a terminal stem of a lesser diameter, the free extremity of which is provided with at least one pair of projections whose front surfaces, turned towards a shoulder defined by it with respect to the body of the first element, are at the same level and slope both with respect to the axis of the first element and with respect to a plane perpendicular to the said axis, the said first element being provided, furthermore, with a threaded portion with which engages a threaded ring nut inserted thereon; a second element, also virtually cylindrical, having internally an axial hole, of a diameter slightly greater than that of the first element, and a number of projections, numerically identical to or a multiple of the number of projections on the stem of the first element, so placed that it be possible to couple them to the projections on the stem of first element, the projections having interstices in such a way as to allow the passage there between of the projections on the stem of the first element and being provided with front surfaces turned towards the inlet mouth for the first element in the second element, in the same plane and perpendicular to the axis of the second element, the front surfaces opposite the said inlet mouth being shaped and sloping so as to accept flush there against the sloping surfaces of the projections on the stem of the first element, after a limited rotation of the latter with respect to the second element, when the first one is inserted in the second one.

The sloping surfaces with which the projections on the stem of the first element and the projections on the second element are provided make it always possible to prevent the first element from rotating with respect to the second element, and vice versa, once the said surfaces have been forced reciprocally flush through the ring nut screwed on the body of the first element.

This makes possible a rapid compensation of any play that may have formed with the passing of time, between the parts, both in the event of axial and radial play.

The presence of the locator member at the side of at least one of the projections with which the second element is provided, permits the first element to be positioned precisely with respect to the second element ready for one to be coupled to the other, without there being any need for a visual check on the said condition to be made.

Furthermore, the precise partial insertion of the first element into the second element prevents, in the event of their coupling accidentally working loose, the latter from oscillating with respect to its axis and, therefore, always keeps the two elements coaxial one with the other.

This is particularly important in cases when the device is used to couple in between the parts thereof, an instrument with a very long handle, since this always stays positioned properly with respect to the body of the instrument, thereby reducing the danger of the projections that have the task of coupling the parts, getting accidentally broken or damaged.

Essential features of the instrument, provided with the device in question, of the type fitted with a handle that is coupled to the support block, or to the body, of the instrument following the insertion of one extremity thereof in the said support block, or body, and a limited rotation of one with respect to the other, are, according to one possible form of embodiment, that provision is made for a handle provided with the first element, and for the second element, complete with the end piece thereof, to be contained in the inside of the body, or of the support block, of the instrument, inserted therein at the time this is being molded, the said second element having the mouth for inserting therein the first element, placed level with the upper surface of the said body or of the said support block.

BRIEF DESCRIPTION OF THE DRAWINGS

The characteristics of the device and of the instrument forming the subject of the invention will now be outlined more fully in the description that follows of one preferred form of embodiment referred to the accompanying drawings, in which:

FIG. 2 shows the second element of the device in question, in sectional form, along the line A—A in FIG. 1;

FIG. 3 shows the second element of the device in question, in a plan view, looking along the direction indicated by the arrow B in FIG. 1;

FIG. 4 shows the second element of the device in question, in a plan view, looking along the direction indicated by the arrow C in FIG. 1, and in cross sectional form;

DESCRIPTION OF THE PREFERRED EMBODIMENT

Figure 1:
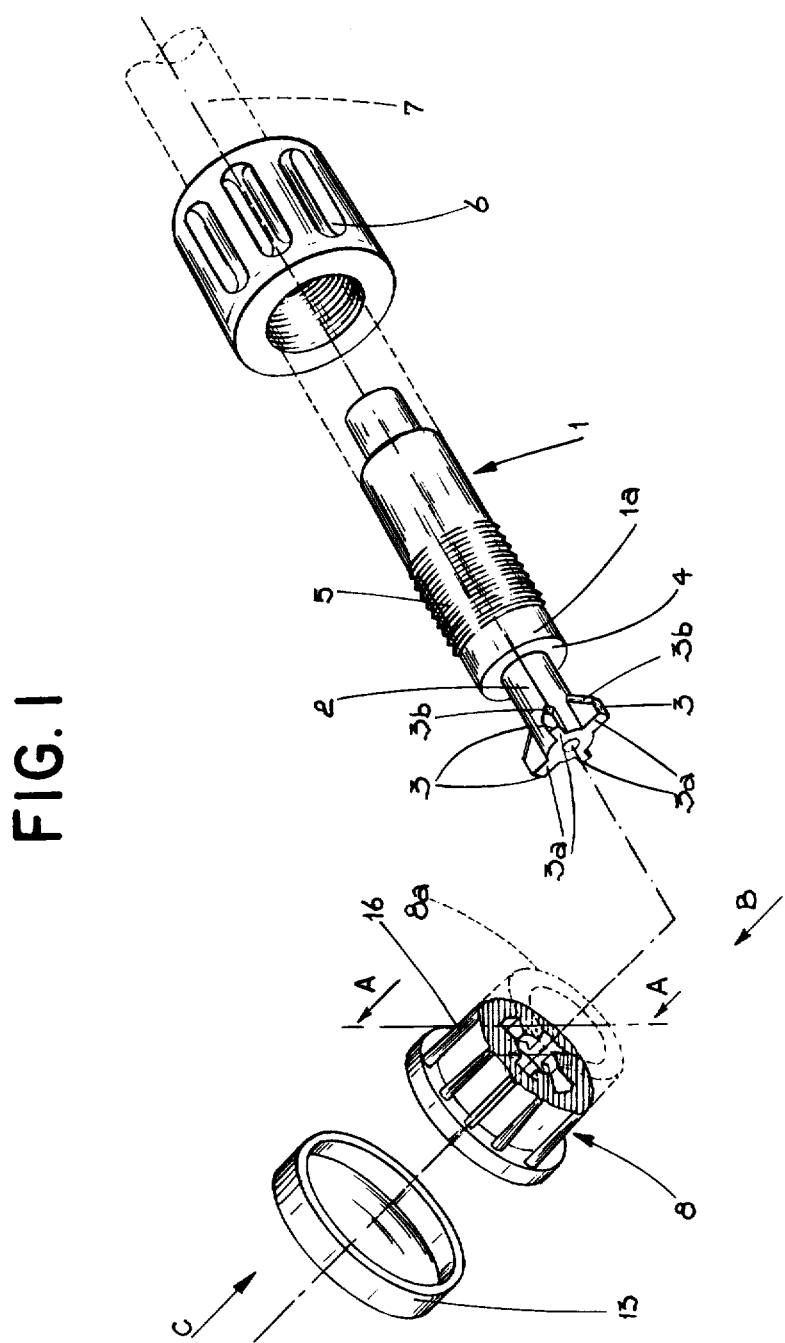
FIG. 1 shows the device in question in an exploded view, with some parts in sectional form so that others may be better emphasized.

With reference to the said figures and, in particular, to FIG. 1, at (1) has been shown the first element forming the device in question.

The said element is virtually cylindrical and it has at the front a terminal stem (2) provided at the free extremity with four projections (3) in the form of a cross.

The projections (3) have their surfaces (3a) turned towards the outside lying in the same plane and perpendicular to the axis of the first element, while their surfaces (3b), turned towards the rim (4) defined by the stem (2) in the region of the area of extension of this from the body of the element (1), slope both with respect to the axis of the element (1) and with respect to a plane perpendicular to the said axis. In the case illustrated, the surfaces (3b) are of "V" conformation turned upside down crosswise with respect to the element (1).

The element (1) is provided externally with a threaded portion (5) with which an internally threaded ring nut (6) is able to engage.

The element (1) can be fashioned at the extremity of a handle (7) or else it can be connected thereto in accordance with various known techniques it is not necessary to describe since they are common knowledge to the technicians in the industry concerned.

At (8) has been shown the second element forming the device in question.

The said element, see FIGS. 1, 2, 3 and 4, consists substantially of a bush provided axially with a hole (8a) of an area slightly greater than that of the element (1) in the zone not affected by the threaded portion (5).

The element (8) has internally a set of four projections (9) in the form of a cross, with interstices so as to permit the passage of the projections (3) there between when, as will be seen below, the element (1) is coupled to the element (8).

The projections (9) have their front surfaces (9a), turned towards the mouth (10) for the insertion of the element (1) into the element (8), lying in the same plane and perpendicular to the axis of the element (8), while their inner surfaces (9b), opposite the front surface (9a), slope and are shaped in such a way as to be complementary and to accept flush therewith the surfaces (3b) of the projections (3) with which the stem (2) of the element (1) is provided. The projections (9) are so positioned that their surfaces (9a) are a certain distance away from the mouth (10), such as to allow the penetration of the extreme portion (1a) of the element (1) into the hole (8a) and to accept flush therewith the rim (4) the latter has. Their longitudinal dimension is such that when the said rim (4), with which the element (1) is provided, is flush up against the surfaces (9a), the projections (3) on the stem (2) are located beyond the said projections (9) so as to allow the rotation of the element (1) with respect to the element (8).

In the case illustrated, at the side of each projection (9) it is envisaged that there be a locator member (11) that extends in depth past the surface (9b) of the said projections (9). When considering a circular trajectory coaxial to the element (8), and following this clockwise, the locator members (11) are each placed upstream in close contact with, or else made in one piece therewith, one of the lateral walls of the corresponding projection (9), in such a way as to all be positioned on the same side with respect to the relevant projection.

The presence of the locator members (11) acts in such a way that, when the element (1) is inserted into the element (8), the first rotation of the former with respect to the latter can only take place in one direction (when looking at FIG. 3, the direction is clockwise) and their extension in a direction longitudinal to the element (8) is such that the walls (11a) (see FIG. 2) form an identical number of walls against which the projections (3) go flush when, under the effect of the said rotation of one with respect to the other, they arrive at a position in which the surfaces (3b) are opposite the surfaces (9b) of the projections (9).

In one preferred form of embodiment, the element (8) is provided, at the base, with a flange (12) on which is fitted an end piece (13) which, in the case illustrated, seals the lower part of the hole (8a).

Figure 5:
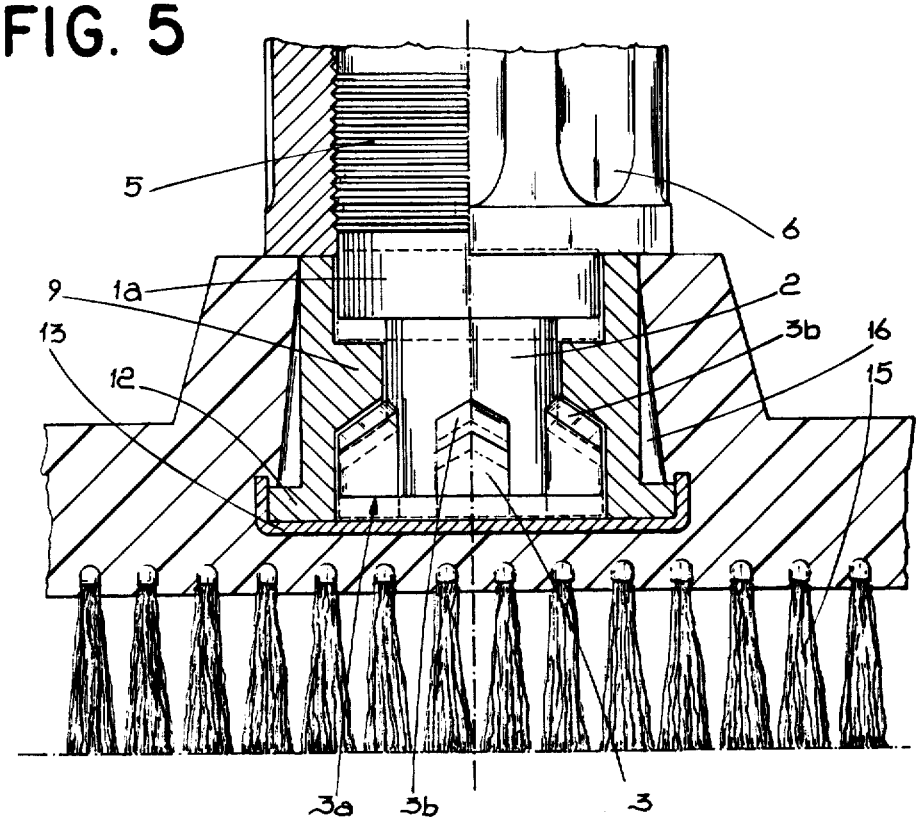
FIG. 5 shows the device in question with the elements thereof assembled in the mutually coupled condition, the first element being secured to a handle and the second element integrated in a support block for the bristles of a broom, scrubbing brush or some other similar article, everything being seen laterally, with some parts in sectional form so that others may be better emphasized.

The second element (8) can be connected to the support or to the body of an instrument, such as for example, the support block (14) of the bristles (15) of a broom (see FIGS. 6 and 8) or of a scrubbing brush (see FIGS. 7 and 8), in accordance with various techniques. In one preferred form of embodiment, the element (8) is incorporated in the said support or body during the molding operation of this (see FIG. 5).

In this case, the end piece (13) has the task of preventing the hole (8a) from being obturated at the time the material is being injected into the mold, and it permits the prevention of apertures in the region of the lower surface of the said body or support. In the case of the support block (14), it makes it possible to have the lower surface (14a) fully available for the uniform distribution of tufts of bristles (15) thereon (see FIG. 8).

In cases when the element (8) is slotted into, or in some way stably secured, from the bottom, to the body or support of the appropriate instrument, the end piece (13) has the task of obturating the inlet hole and, again in the case of the support block (14), of allowing the surface (14a) to be fully available for the fitting thereto of the tufts of bristles (15). In this latter instance, the gage of the end piece (13) will be adequate to realize the aforementioned conditions.

Again in one preferred form of embodiment, the element (8) can be provided externally with a number of protruding ribs (16) that prevent the rotation thereof with respect to the body or support in which it is inserted.

The coupling of the first element (1) to the second element (8) and thus to the handle (7), the body, or support of an instrument, such as for example the support block (14), takes place in the following way.

First of all, the ring nut is moved into a position retracted with respect to the front part (1a) of the element (1). The element (1) is then inserted into the element (8), with the stem (2) and the projections (3) placed in the condition illustrated with dashes in FIG. 3.

With the rim (4) of the element (1) flush up against the surfaces (9a) of the projections (9), and with the part (1a) thereof inserted in the hole (8a) (see the position indicated with dashes in FIG. 5), the handle (7), and therefore the element (1), is made to rotate clockwise until the projections (3) arrive flush up against the walls (11a) of the locator members (11).

At this stage, holding the handle (7) firm, the ring nut (6) is rotated in such a way as to carry it flush up against the mouth (10) of the element (8), or up against the body or the support block of the instrument and, afterwards, to cause the element (1) to move back a little with respect to the element (8) until the surfaces (3b) and (9b) have been forced flush with the projections (3) and (9), respectively. Once this condition has been achieved, the coupling of the handle (7) to the support block (14) has been accomplished in a stable manner.

The instrument provided with the device in question thus has externally just the ring nut (6) by means of which it is possible to rapidly take up any play that may have formed between the parts because of the passing of time or use, while the remaining parts of the device are hidden completely.

Figure 6:
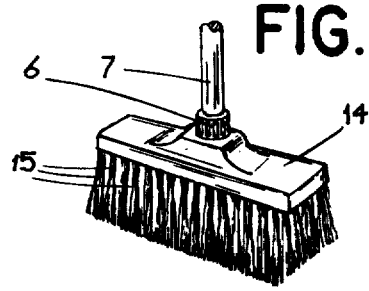
FIG. 6 shows diagrammatically a broom provided with the device in question for connecting the handle to the bristle support block.
Figure 7:
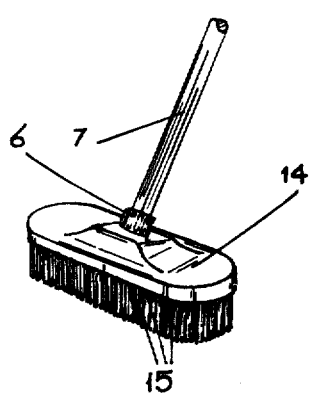
FIG. 7 shows diagrammatically a scrubbing brush provided with the device in question for connecting the handle to the bristle support block, with the former sloping with respect to the latter.
Figure 8:
FIG. 8 shows the broom or scrubbing brush depicted in FIGS. 6 and 7, in a plan view seen from the bottom thereof.

In the specific instance of instruments such as brooms, scrubbing brushes, paint brushes and similar, the instrument is provided with tufts of bristles distributed uniformly over the full surface opposite that from which the handle extends. The latter can then be in a position perpendicular with respect to the body, or to the support, of the instrument, or else slope as illustrated in FIGS. 6 and 7.

Constructional variants may, in practice, be envisaged for the first element (1) and for the second element (8). For example, the number of projections (3), and consequently of projections (9), can be varied. They could be two in number, one diametrically opposed to the other, or be three placed along the vertices of a triangle.

The surfaces (3b) and (9b) of the said projections may also be of a conformation that differs from the one shown in the drawings and be, for example, arcuate, leaving unchanged the fact of being sloping with respect to the axis of the elements (1) and (8), respectively, and with respect to a plane perpendicular to the said axis.

What is claimed is:

1. A device for rigidly coupling a handle to a manual instrument comprising a first substantially cylindrical element having a stem of reduced diameter at one end, a shoulder defined between said stem and the remainder of the element, at least one pair of projections provided on the free end of said stem having surfaces which face towards said shoulder and which are at the same level and slope with respect to the cylindrical axis of said element and with respect to a plane perpendicular to said axis, a threaded portion on said first element, a threaded ring nut for insertion on said element and engagement with said threaded portion, a second substantially cylindrical element having an axial hole of slightly greater diameter than that of the first element for receiving the latter and a number of projections numerically identical to or a multiple of the number of projections on said stem, said projections in said hole being so positioned whereby they can be coupled with the projections on said stem and having interstices such as to allow the passage therebetween of the projections on said stem, said projections in said hole having surfaces which face towards an end of said hole which receives said first element and which are in the same plane and perpendicular to the cylindrical axis of said second element, and said projections in said hole also having surfaces which face away from the end of said hole which receives said first element which are shaped and sloping so as to accept flush thereagainst the sloping surfaces of the projections on said stem after a limited rotation of the first element with respect to the second element when the first element is inserted into the second element.

2. A device according to claim 1, wherein the surfaces of the projections of said second element which face towards the end of said hole which receives said first element are positioned at a distance away from said end of said hole such as to allow insertion of said stem into said hole.

3. A device according to claim 1, wherein at least one locator member is positioned at the side of at least one of the projections of said second element that extends in depth, longitudinally in said second element until it passes the profile of the surface of said at least one projection of said second element, said locator member having a wall designed to accept flush therewith a lateral wall of one projection of said stem when the projections of said stem are positioned with their sloping surfaces flush against the sloping surfaces of the projections inside said second element.

4. A device according to claim 1, wherein said second element has an external flange at the end thereof opposite the end into which the first element is inserted, and an end piece fitted on said flange for sealing said axial hole of said second element.

5. A device according to claim 1, wherein the sloping surfaces of the projections of said first element and said second element have a transverse profile substantially of "V" shape complementary with each other.

6. A devive according to claim 1, wherein the sloping surfaces of the projections of said first element and said second element have an arcuate transverse profile complementary with each other.

7. An instrument provided with the device according to any one of claims 1, 2, 3, 4, 5, or 6, of the type fitted with a handle that is coupld to a molded support block or body of the instrument following the insertion of one extremity of the handle into the said support block or body and a limited rotation of one with respect to the other, wherein the handle is provided with said first element and the second element is contained in the inside of the support block or body and inserted therein at the time the latter is molded, the end of the axial hole which receives said first element being placed level with an upper surface of said support block or body.

8. An instrument provided with the device according to claim 4, of the type fitted with a handle that is coupled to a support block or body of the instrument following the insertion of one extremity of the handle into the said support block or body and a limited rotation of one with respect to the other, wherein the handle is provided with said first element and the second element is inserted inside a housing having a locator wall in the support block or body of the instrument, and said end of the axial hole which receives said first element being placed level with an upper surface of said support block or body and with the external flange of said second element flush against said locator wall, said housing being obturated by said end piece fitted on said flange.

* * * * *